(12) United States Patent
Kim et al.

(10) Patent No.: US 8,394,524 B2
(45) Date of Patent: Mar. 12, 2013

(54) BATTERY UNIT AND LITHIUM SECONDARY BATTERY EMPLOYING THE SAME

(75) Inventors: Joong-Hun Kim, Yongin-si (KR); Hyung-Bok Lee, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/419,094

(22) Filed: Mar. 13, 2012

(65) Prior Publication Data
US 2012/0225336 A1 Sep. 6, 2012

Related U.S. Application Data

(62) Division of application No. 10/448,089, filed on May 30, 2003, now Pat. No. 8,158,279.

(30) Foreign Application Priority Data

Jul. 9, 2002 (KR) .............................. 2002-0039731

(51) Int. Cl.
*H01M 2/14* (2006.01)
(52) U.S. Cl. ........ 429/143; 429/129; 429/131; 429/133; 429/139; 429/142; 429/211
(58) Field of Classification Search .................. 429/129, 429/131, 133, 139, 142, 143, 211
See application file for complete search history.

(56) References Cited

U.S. PATENT DOCUMENTS

| | | | |
|---|---|---|---|
| 4,098,965 | A | 7/1978 | Kinsman |
| 4,650,730 | A | 3/1987 | Lundquist et al. |
| 5,208,120 | A | 5/1993 | Winger |
| 5,603,737 | A | 2/1997 | Marincic et al. |
| 6,153,335 | A | 11/2000 | Vutetakis et al. |
| 6,692,866 | B2 | 2/2004 | Watanabe et al. |

FOREIGN PATENT DOCUMENTS

| | | |
|---|---|---|
| JP | 405074444 A | 3/1993 |
| JP | 11-307107 | 11/1999 |
| JP | 11-307128 | 11/1999 |
| JP | 11-329408 | 11/1999 |
| JP | 2001-217149 | 8/2001 |
| KR | 10-2000-0051636 | 8/2000 |

*Primary Examiner* — Patrick Ryan
*Assistant Examiner* — Ladan Mohaddes
(74) *Attorney, Agent, or Firm* — Robert E. Bushnell, Esq.

(57) ABSTRACT

A battery unit and a lithium secondary battery employing the same are provided. The battery unit includes a positive electrode plate having a positive current collector and a positive active material layer formed on at least one plane of the positive current collector, a positive electrode lead electrically connected with the positive current collector, a negative electrode plate having a negative current collector and a negative active material layer formed on at least one plane of the negative current collector, a negative electrode lead electrically connected with the negative current collector, and a separator interposed between the positive electrode plate and the negative electrode plate, having a width greater than that of each electrode plate, and having different widths of protruding portions which stick out on either side of the electrode plate.

14 Claims, 4 Drawing Sheets

BATTERY UNIT AND LITHIUM SECONDARY BATTERY EMPLOYING THE SAME

CROSS-REFERENCE TO RELATED APPLICATIONS AND CLAIM OF PRIORITY

This application is a divisional of Applicants' Ser. No. 10/448,089 entitled BATTERY UNIT AND LITHIUM SECONDARY BATTERY EMPLOYING THE SAME filed in the U.S. Patent & Trademark Office on 30 May 2003, which was issued on 17 Apr. 2012 as U.S. Pat. No. 8,158,279, and assigned to the assignee of the above-captioned application. Furthermore, this application makes reference to, incorporates the same herein, and claims all benefits accruing under 35 U.S.C. §119, §120 and §121 from the aforesaid Applicant's Ser. No. 10/448,089 and from an application for BATTERY UNIT AND THE LITHIUM SECONDARY BATTERY APPLYING THE SAME earlier filed in the Korean Industrial Property Office on 9 Jul. 2002 and there duly assigned Serial No. 2002-39731.

BACKGROUND OF THE INVENTION

1. Field of the Invention

The present invention relates to a lithium secondary battery, and more particularly, a battery unit having variable margins of protruding portions of a separator interposed between opposing electrode plates, the protruding portions sticking out on either side of each electrode plate, and a lithium secondary battery employing the battery unit.

2. Description of the Related Art

A lithium secondary battery can be classified into a liquid electrolyte battery and a polymer electrolyte battery according to the kind of electrolytic solution used. In general, a battery using a liquid electrolyte is referred as a lithium ion battery, and a battery using a polymer electrolyte is referred to as a lithium polymer battery.

Such a lithium secondary battery can be manufactured in various shapes, typically cylindrical and rectangular shapes mainly used in lithium ion batteries. Lithium polymer batteries, which have recently gained much attention, are manufactured by flexible materials, having relatively high freedom in shape. Also, since the lithium polymer batteries are highly safe and lightweight, they are advantageously used for attaining slim, light portable electronic devices.

A battery unit of a conventional lithium secondary battery includes a plurality of electrode plates having different polarities, and a separator interposed between the electrode plates. The battery unit is wound in a jelly-roll type in which a positive electrode plate, a separator and a negative electrode plate are sequentially disposed.

The electrode plates includes an electrode current collector and an electrode active material layer coated on the surface of the electrode current collector. The electrode current collector includes an electrode uncoated area where the electrode active material layer is not coated. An electrode lead is attached to the electrode uncoated area. A protective tape is wrapped at an end of the electrode lead.

The separator is interposed between the plurality of electrode plates having different polarities in order to insulate the electrode plates from each other, and has a width greater than that of each electrode plate. The entire width W1 of the separator equals, the sum of the width W2 of the electrode plate and the widths W3 and W4 of protruding portions of the separator which stick out on either side of the electrode plate.

As described above, since the width of the separator is greater than that of the electrode plate by the sum of widths of the protruding portions of the separator which stick out on either side of the electrode plate, it can prevent the electrode plates having different polarities from contacting each other. Accordingly, electrical short-circuit between the electrode plates can be prevented. Here, the widths W3 and W4 of the protruding portions of the separator are substantially the same with each other.

The conventional battery unit having the above-described configuration can be completed by disposing the separator between the plurality of electrode plate having different polarities and then winding the resultant structure in a jelly-roll type.

The battery unit is housed in a pouch type case. The case includes an upper case member, and a lower case member coupled to the upper case member and having a space in which the battery unit can be accommodated. The upper and lower case members are incorporated at one or more sides for simplifying the manufacturing process.

After the battery unit is housed in the case, predetermined heat and pressure are applied to a sealing plane formed at the edge of the case, to complete a battery assembling work.

However, the conventional battery unit has the following problems.

First, the separator made of a polymer, which is weak against heat; may shrink or deform due to heat applied during heat fusion. In particular; thermal deformation is apt to occur at both edges of shorter sides of the case from which the electrode lead is drawn because heat is transferred thereto during heat fusion of the sealing plane.

The reason of the foregoing is because of a small design margin for the width W3 of the protruding portion of the separator which sticks out on one side of the electrode plate, from which the electrode lead is drawn.

In other words, the width W3 of the protruding portion of the separator corresponds to a width at a joint portion of the upper and lower case members, and is the same as the width W4 of the protruding portion of the separator which sticks out on the other side of the electrode plate, where no thermal deformation occurs.

Thus, if the separator is deformed by heat, the electrode plates having different polarities are electrically connected to each other at the shorter side edge of the case, resulting in a short-circuit.

In order to solve the problem, the widths of the protruding portions of the separator may be increased. However, this approach increases the overall volume of the battery unit, making it difficult to attain a high-capacity battery.

Next, in the case where the case has a structure of a polymer layer, a metal foil layer and a polymer layer sequentially stacked, if the metal foil layer as an intermediate layer is exposed, the separator may shrink or deform so that the separator is brought into contact with the exposed portion, thereby increasing the likelihood of corrosion of the metal foil layer due to a difference, in oxidation potential.

SUMMARY OF THE INVENTION

It is therefore, an object of the present invention to provide a battery unit which can prevent short-circuit between electrode plates by varying widths of protruding portions of the separator which stick out the electrode plates, and a lithium secondary battery employing the same.

It is another object to provide a battery unit that can prevent deformation of the separator due to heat applied during heat fusion.

It is yet another object to provide a battery that has improved stability.

It is still another object to provide a battery preventing short-circuits with the battery and yet not reduce battery performance.

It is yet another object to provide a battery that prevents corrosion of the metal layer in the battery.

It is another object to provide a battery that is easy and inexpensive to manufacture.

It is still another object of the present invention to provide a battery unit which can prevent continuous corrosion due to electrical contact between electrode plates and a battery case, and a lithium secondary battery employing the same.

In accordance with an aspect of the present invention, there is provided a battery unit including a positive electrode plate having a positive current collector and a positive active material layer formed on at least one plane of the positive current collector, a positive electrode lead electrically connected with the positive current collector, a negative electrode plate having a negative current collector and a negative active material layer formed on at least one plane of the negative current collector, a negative electrode lead electrically connected with the negative current collector, and a separator interposed between the positive electrode plate and the negative electrode plate, having a width greater than that of each electrode plate, and having different widths of protruding portions which stick out on either side of the electrode plate.

Also, the separator is configured such that a width of one protruding portion thereof which sticks out on one side of the electrode plate is greater than that of the other protruding portion thereof which sticks out on the other side of the electrode plate.

Further, the protruding portion having a greater width is positioned at a location corresponding to a portion of the electrode plate from which the electrode lead is drawn.

The width of the protruding portion of the separator which sticks out on one side of the electrode plate is greater than that of the other protruding, portion so as to be in the range of 6:4 to 9:1.

In accordance with another aspect of the present invention, there is provided a lithium secondary battery including a battery unit in which a positive electrode plate, a separator and a negative electrode plate are sequentially disposed and wound, a positive electrode lead electrically connected with the positive electrode plate and drawn from the positive electrode plate, a negative electrode lead electrically connected with the negative electrode plate and drawn from the negative electrode plate, and a case having a space in which the battery unit is accommodated and which provides a sealing plane heat-fused along the edge of the space, wherein the separator has a width greater than that of the electrode plate and has different widths of protruding portions which stick out on either side of the electrode plate.

Also, the separator is configured such that a width of one protruding portion thereof which sticks out on one side of the electrode plate from which the electrode lead is drawn is greater than that of the other protruding portion thereof which sticks out on the other side of the electrode plate.

Further, the protruding portion having a smaller width is positioned at a location corresponding to a portion of the case whose sealing plane is not heat-fused.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
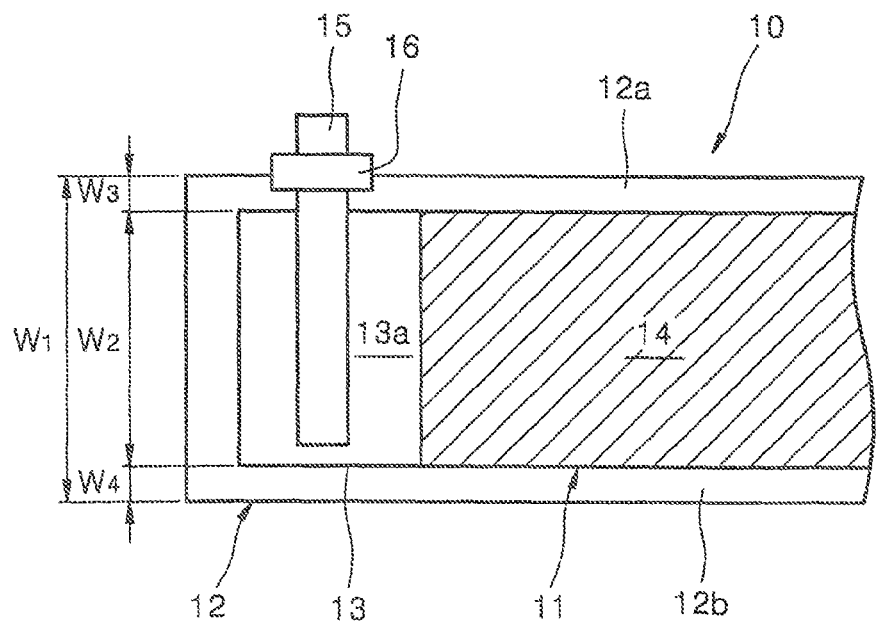
FIG. 1 is plane view showing a part of a conventional battery unit.

Referring to FIG. 1, a battery unit 10 of a conventional lithium secondary battery includes a plurality of electrode plates 11 having different polarities, and a separator 12 interposed between the electrode plates 11. The battery unit 10 is wound in a jelly-roll type in which a positive electrode plate, a separator and a negative electrode plate are sequentially disposed.

The electrode plates 11 includes an electrode current collector 13 and an electrode active material layer 14 coated on the surface of the electrode current collector 13. The electrode current collector 13 includes an electrode uncoated area 13a where the electrode active material layer 14 is not coated. An electrode lead 15 is attached to the electrode uncoated area 13a. A protective tape 16 is wrapped at an end of the electrode lead 15.

The separator 12 is interposed between the plurality of electrode plates 11 having different polarities in order to insulate the electrode plates 11 from each other, and has a width greater than that of each electrode plate 11. The entire width W1 of the separator 12 equals the sum of the width W2 of the electrode plate 11 and the widths W3 and W4 of protruding portions 12a and 12b of the separator 12 which stick out on either side of the electrode plate 11.

As described above, since the width of the separator 12 is greater than that of the electrode plate 11 by the sum of widths of the protruding portions of the separator 12 which stick out on either side of the electrode plate 11, it can prevent the electrode plates 11 having different polarities from contacting each other. Accordingly, electrical short-circuit between the electrode plates 11 can be prevented. Here, the widths W3 and W4 of the protruding portions 12a and 12b of the separator 12 are substantially the same with each other.

The conventional battery unit 10 having the above-described configuration can be completed by disposing the separator 12 between the plurality of electrode plate 11 having different polarities and then winding the resultant structure in a jelly-roll type.

Figure 2:
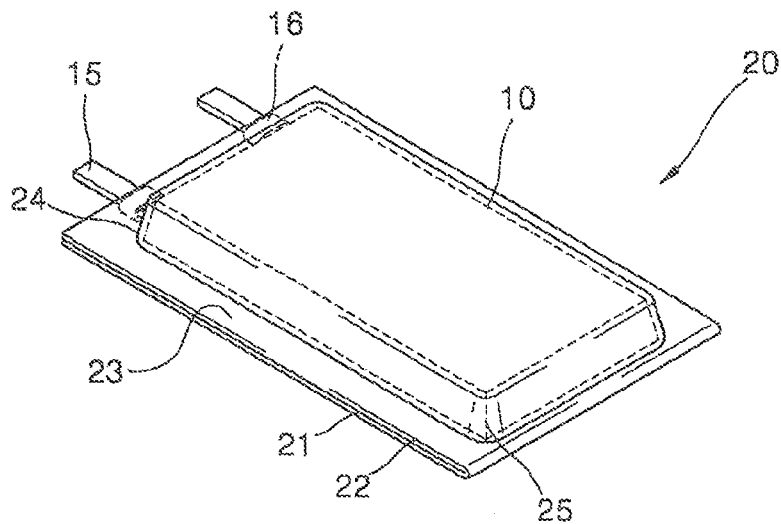
FIG. 2 is a perspective view of a case covering the battery unit of FIG. 1.

The battery unit 10 is housed in a pouch type case 20, as shown in FIG. 2. The case 20 includes an upper case member 21, and a lower case member 22 coupled to the upper case member 21 and having a space in which the battery unit 10 can be accommodated. The upper and lower case members 21 and 22 are incorporated at one or more sides for simplifying the manufacturing process.

After the battery unit 10 is housed in the case 20, predetermined heat and pressure are applied to a sealing plane 23 formed at the edge of the case 20, to complete a battery assembling work.

However, the conventional battery unit 10 has the following problems.

First, the separator 12 made of a polymer, which is weak against heat, may shrink or deform due to heat applied during heat fusion. In particular, thermal deformation is be apt to occur at both edges 24 of shorter sides of the case 20 from which the electrode lead 15 is drawn because heat is transferred thereto during heat fusion of the sealing plane Z3.

The reason of the foregoing, is because of a small design margin for the width W3 of the protruding portion 12a of the separator 12 which sticks out on one side of the electrode plate 11, from which the electrode lead 15 is drawn.

In other words, the width W3 of the protruding portion 12a of the separator 12 corresponds to a width at a joint portion 25 of the upper and lower case members 21 and 22, and is the same as the width W4 of the protruding portion 12b of the separator 12 which sticks out on the other side of the electrode plate 11, where no thermal deformation occurs.

Thus, if the separator 12 is deformed by heat, the electrode plates 11 having different polarities are electrically connected to each other at the shorter side edge 24 of the case 20, resulting in a short-circuit.

In order to solve the problem, the widths of the protruding portions 12a and 12b of the separator 12 may be increased. However, this approach increases the overall volume of the battery unit 10, making it difficult to attain a, high-capacity battery.

Next, in the case where the case has a structure of a polymer layer, a metal foil layer and a polymer layer sequentially stacked, if the metal foil layer as an intermediate layer is exposed, the separator 12 may shrink or deform so that the separator 12 is brought into contact with the exposed portion, thereby increasing the likelihood of corrosion of the metal foil layer due to a difference in oxidation potential.

A lithium secondary battery according to a preferred embodiment of the present invention will now be described in detail.

Figure 3:
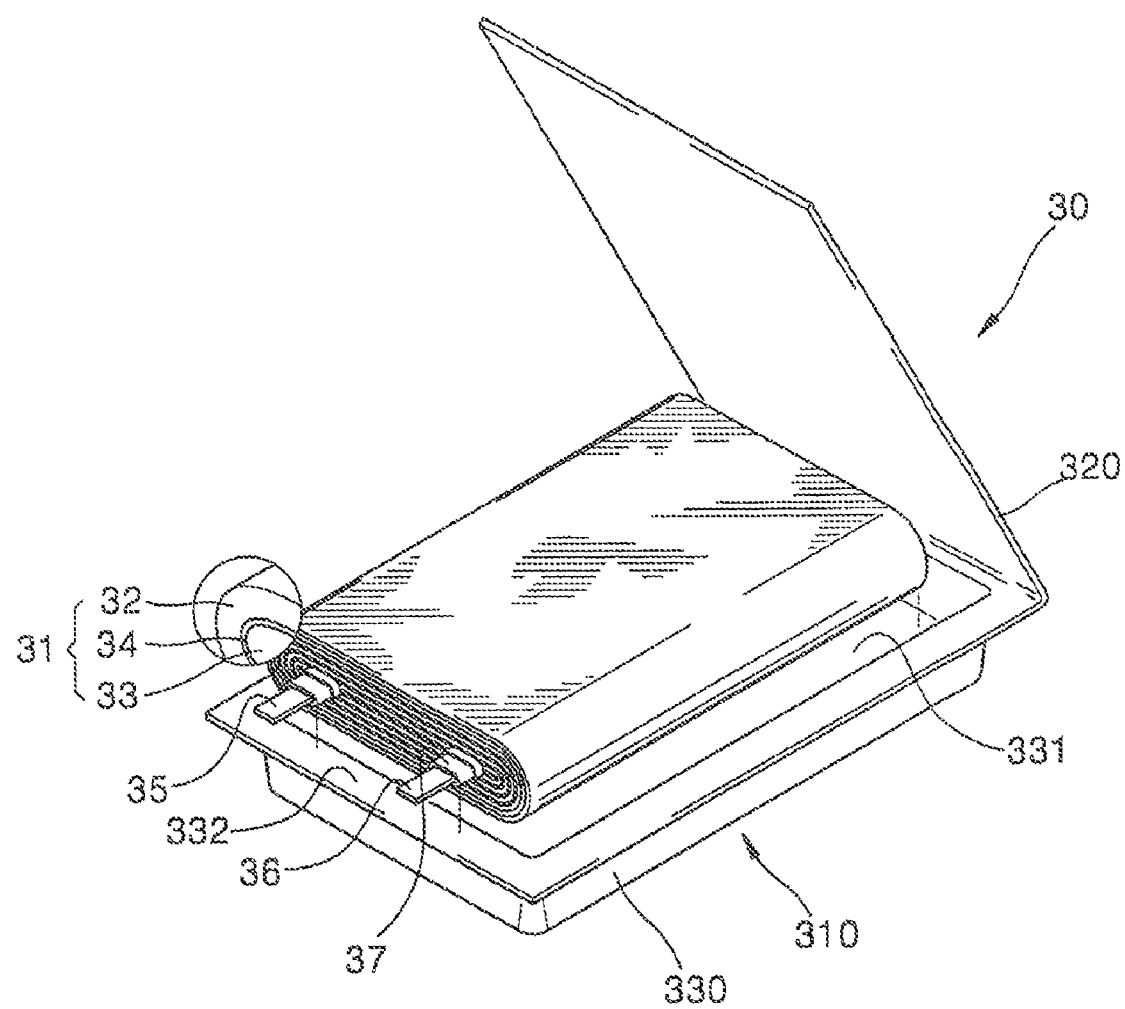
FIG. 3 is an exploded view of a secondary lithium battery according to a preferred embodiment of the present invention.

FIG. 3 illustrates a lithium secondary battery 30 according to a preferred embodiment of the present invention.

Referring to FIG. 3, the lithium secondary battery 30 includes a battery unit 31, and a case 310 in which the battery unit 31 is accommodated.

The battery unit 31 includes a positive electrode plate 32, a negative electrode plate 33, and a separator 34 interposed therebetween and insulating each other. The positive and negative electrode plates 32 and 33 and the separator 34 are sheets of strips, respectively. The battery unit 31 is completed such that the positive electrode plate 32, the separator 34 and the negative electrode plate 33 are sequentially disposed and wound in a jelly-roll type.

A positive electrode lead 35 and a negative electrode lead 36 are electrically connected with the respective positive and negative electrode plates 32 and 33. A protective tape 37 is wrapped around a portion of each of the positive and negative electrode leads 35 and 36.

The case 310 includes an upper case member 320 and a lower case member 330 coupled to the upper case member 320. A spacer 331 where the battery unit 31 can be accommodated is formed when the upper and lower case members 320 and 330 are sealed to each other.

The upper and lower case members 320 and 330 are coupled to each other at one side, and provide a sealing plane 332 to be heat-fused along the edge of the space 331.

The battery unit 31 is housed in the space 331 formed in the case 320. Parts of the positive and negative electrode leads 35 and 36 electrically connected with respective electrode plates 32 and 33 are drawn outside the case 320 through the sealing plane 332 to serve as electrode terminals.

The battery unit 31 according to the present invention features that, in order to prevent electric short-circuit between the respective electrode plates 32 and 33 due to shrinkage or deformation of the separator 34 during heat fusion of the sealing plane 332 of the upper and lower case members 320 and 330, the adhesion margin of the separator 34 with respect to the respective electrode plates 32 and 33 is adjusted. This will now be described in more detail.

Figure 4:
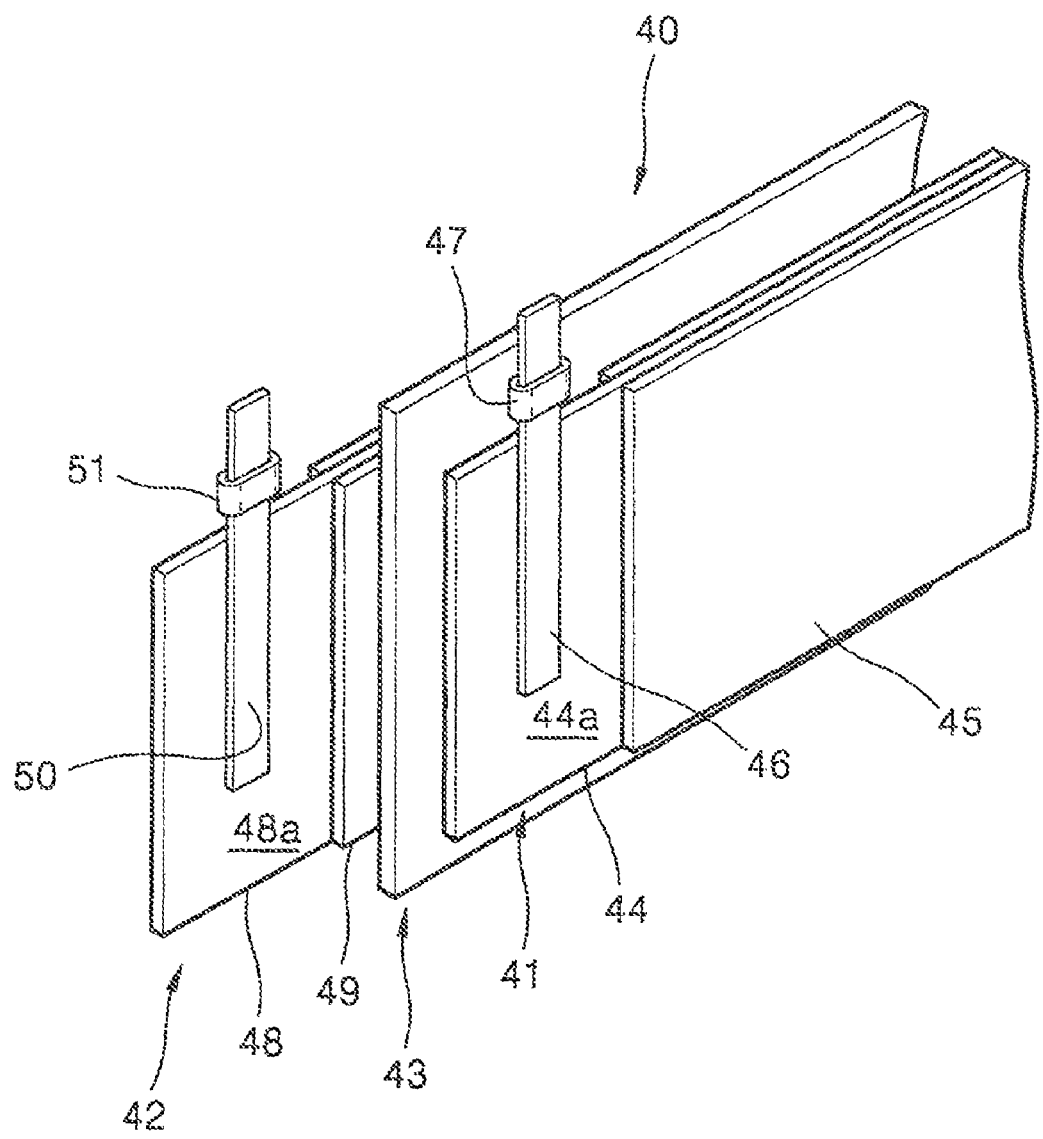
FIG. 4 is an exploded view of a battery unit according to a preferred embodiment of the present invention.

FIG. 4 illustrates a battery unit 40 according to the present invention. Referring to FIG. 4, the battery unit 40 includes a positive electrode plate 41, a negative electrode plate 42, and a separator 43 interposed between the positive and negative electrode plates 41 and 42.

The positive electrode plate 41 includes a positive current collector 44 made of a strip-shaped metal foil and a positive active material layer 45 coated on both surfaces of the positive current collector 44. The positive current collector 44 is preferably formed of an aluminum foil having good conductivity. The positive active material layer 45 is made of a composition prepared by mixing a binder, a conductive agent and a plasticizer with a positive active material such as lithium oxide.

At least one positive uncoated area 44a, that is, an area where the positive active material layer 45 is not formed, is partly formed on either side of the positive current collector 44. A positive electrode lead 46 is electrically connected with the positive uncoated area 44a by, for example, welding. A protective tape 47 made of an insulating polymer resin is wrapped around an end portion of the positive electrode lead 46.

The negative electrode plate 42 includes a negative current collector 48 made of a strip-shaped metal foil, and a negative active material layer 49 coated on both surfaces of the negative current collector 48. The negative current collector 48 is preferably formed of a copper foil which is a metallic material having good conductivity. The negative active material layer 49 is made of a composition prepared by mixing a binder and a plasticizer with a negative active material such as a carbon material.

Like in the positive electrode plate 41, a negative uncoated area 48a, that is, an area where the negative active, material layer 49 is not formed, is partly formed on either side of the negative current collector 48. A negative electrode lead 50 is electrically connected with the negative uncoated area 48a. A protective tape 51 made of an insulating material is wrapped around an end portion of the negative electrode lead 50.

The separator 43 is formed by coating a semi-solid electrolyte on a highly formable polymer such as polyethylene. The separator 43 is interposed between the positive and negative electrode plates 41 and 42. The width of the separator 43 is greater than that of each of the electrode plates 41 and 42, while widths of protruding portions thereof which stick out on either side of the electrode plates 41 and 42 are made different from each other.

Figure 5:
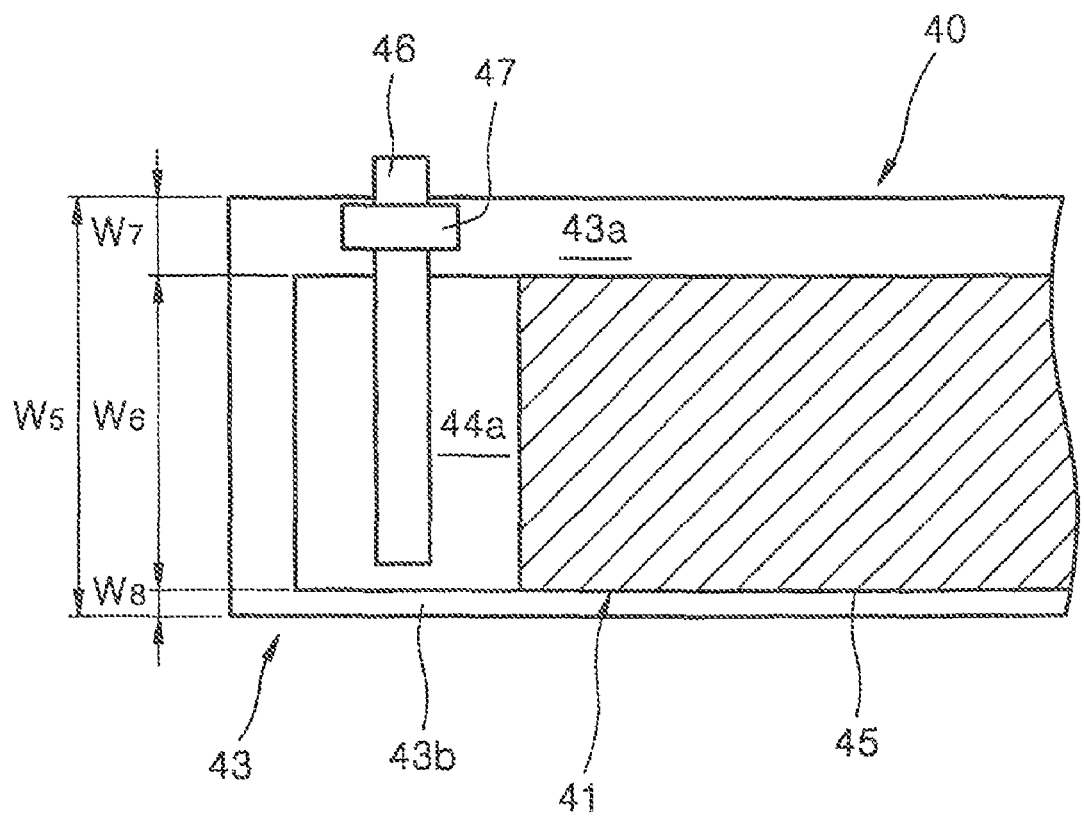
FIG. 5 is a plane view showing a part of the battery unit of FIG. 4.

Referring to FIG. 5, a positive electrode plate 41 is disposed in front of the separator 43. Although not shown in FIG. 5, a negative electrode plate 42 is disposed in rear of the separator 43, which is substantially the same as the case of the positive electrode plate 41 and a detailed explanation thereof will not be given.

The positional relationship between the positive electrode plate 41 and the separator 43 will now be described.

The entire width W5 of the separator 41 equals the sum of the width W6 of the positive electrode plate 41 and widths W7 and W8 of protruding portions which stick out on either side of the positive electrode plate 41. In this manner, the separator 43 has a width greater than that of the positive electrode plate 41.

Also, the widths of protruding portions which stick out on either side of the positive electrode plate 41 are different from each other. In other words, one protruding portion 43a of the separator 43 from which the positive electrode lead 46 electrically connected with the positive is current collector 44 is drawn, is formed as widely as possible in order to suppress the sealing plane of the case from being adversely affected by heat fusion during winding of the battery unit.

On the other hand, since the other protruding portion 43b of the separator 43, which sticks out on the other side of the case to which heat is not applied during heat fusion, is little affected by heat, it is formed as narrowly as possible.

Preferably, the ratio of the width W7 of one protruding portion 43a which sticks out on one side of the positive electrode plate 41 to the width of the other protruding portion 43b is approximately 6:4 to 9:1. In other words, the width W7 a one protruding portion 43a is greater than that of the other protruding portion 43b so as to be in the above range. In such a state, winding can be performed.

If the ratio of the width of the one protruding portion 43a to the width of the other protruding portion 43b is smaller than 6:4, deformation due to heat applied to the separator 43 is liable to occur during heat fusion. Conversely, if the ratio of the width of one protruding portion 43a to the width of the other protruding portion 43b is greater than 9:1, the margin for the other protruding portion 43b cannot be provided. The separator 43 having the design margin can be manufactured to have the same width as that of the conventional separator 12 (see FIG. 1) without a reduction in capacity.

In the battery unit 40 having the above-described configuration, the separator 43 is interposed between the positive and negative electrode plates 41 and 42, and the positive and negative electrode plates 41 and 42 are positioned with respect to the separator 43 so as to have protruding portions 43a and 43b on either side thereof within the above-described range, followed by winding.

The thus-wound, battery unit 40 is accommodated in a space formed in the case, and then predetermined heat and pressure are applied to the sealing plane provided along the edge of the space, thereby completing a lithium secondary battery.

The battery unit 40 is configured so as to maximize the design margin of one protruding portion 43a of the separator 43, corresponding to portions from which the electrode leads 46 and 50 are drawn outside the electrode plates 41 and 42, respectively. Thus, short-circuit between the respective electrode plates 41 and 42 of the battery unit 40 can be prevented.

As described above, the battery unit according to the present invention and the lithium secondary battery employing the same have the following advantages.

First, since the design margins of protruding portions of a separator which stick out on either side of each electrode plates are made different from each other, deformation of the separator due to heat applied during heat fusion can be prevented. Accordingly, electrical contact between electrode plates having different polarities can be prevented, thereby improving the stability of a battery.

Second, since a high-capacity battery can be attained by adjusting the margins of protruding portions of the separator which stick out on either side of the electrode plate, the overall volume of the battery unit is increased, thereby preventing deterioration in battery performance.

Third, electrical contact between a metal foil layer among case forming layers and the electrode plates or electrode leads due to shrinkage or deformation of and the separator, can be prevented, thereby preventing likelihood of corrosion of the metal foil layer due to a difference in oxidation potential.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A battery unit included in a case, comprising:
an electrode plate of a first conductivity including a current collector of the first conductivity and an active material layer of the first conductivity formed on at least one plane of said current collector of the first conductivity and a first electrode lead electrically connected with said current collector of the first conductivity, said first electrode lead protruding beyond said electrode plate of the first conductivity in a longitudinal direction;
an electrode plate of a second conductivity including a current collector of the second conductivity and an active material layer of the second conductivity formed on at least one plane of the current collector of the second conductivity and a second electrode lead electrically connected with said current collector of the second conductivity and protruding beyond said electrode plate of the second conductivity in the longitudinal direction; and
a separator interposed between said electrode plates of first and second conductivity, said separator including a width greater than said electrode plates of first and second conductivity, said separator including a first protruding portion protruding on one side of said electrode plates where said electrode leads protrude beyond said electrode plates and a second protruding portion protruding on a second side of said electrode plates where no electrode lead protrudes beyond, said first protruding portion having a width of protrusion beyond said electrode plates greater than a width of protrusion beyond said electrode plates of said second protruding portion.

2. A secondary battery comprising:
a battery unit comprising:
an electrode plate of a first conductivity comprising a current collector of the first conductivity and an active material layer of the first conductivity formed on at least one surface of the current collector of the first conductivity;
a first electrode lead electrically connected to the current collector of the first conductivity;
an electrode plate of a second conductivity comprising a current collector of the second conductivity and an active material layer of the second conductivity formed on at least one surface of the current collector of the second conductivity;
a second electrode lead electrically connected to the current collector of the second conductivity; and
a separator interposed between the electrode plate of the first conductivity and the electrode plate of the second conductivity; and
a case including a space accommodating the battery unit and providing a sealing plane heat-fused along an edge of the space,
the separator comprising a first protruding portion protruding on a first side of the electrode plates and a second protruding portion protruding on a second side of the electrode plates, and
a width of protrusion of the first protruding portion being greater than a width of protrusion of the second protruding portion.

3. The secondary battery of claim 2, wherein a ratio of the width of protrusion of the first protruding portion to the width of protrusion of the second protruding portion is in a range of approximately 6:4 to approximately 9:1.

4. The secondary battery of claim 2, wherein a ratio of the width of protrusion of the first protruding portion to the width of protrusion of the second protruding portion is approximately 6:4.

5. The secondary battery of claim 2, wherein a ratio of the width of protrusion of the first protruding portion to the width of protrusion of the second protruding portion is approximately 9:1.

6. The secondary battery of claim 2, wherein the first protruding portion is positioned at a location corresponding to portions of the electrode plates from which the first and second electrode leads are drawn.

7. The secondary battery of claim 2, wherein the second protruding portion is positioned at a location corresponding to a portion of the case where the sealing plane is not heat-fused.

8. The secondary battery of claim 2, wherein the electrode plate of the first conductivity, the separator, and the electrode plate of the second conductivity are wound in a jelly-roll.

9. The secondary battery of claim 8, wherein
the first electrode lead is electrically connected to an area where the active material layer of the first conductivity is not formed on the current collector of the first conductivity, and
the second electrode lead is electrically connected to an area where the active material layer of the second conductivity is not formed on the current collector of the second conductivity.

10. The secondary battery of claim 9, wherein the first and second electrode leads are formed on portions of the current collectors of the first and second conductivity, respectively, from where winding starts.

11. The secondary battery of claim 2, wherein a protective tape is wound around an exterior surface of at least one of the first and second electrode leads.

12. The secondary battery of claim 2, wherein the width of the separator equals the sum of a width of each of the electrode plates, the width of the first protruding portion protruding on the first side of the electrode plates, and the width of the second protruding portion protruding on the second side of the electrode plates.

13. The secondary battery of claim 12, wherein the first and second protruding portions protrude on upper and lower sides of the electrode plates, respectively, in a width direction of the electrode plates, the width direction is transverse to a direction corresponding to length of the electrode plates.

14. The secondary battery of claim 12, wherein the width of the current collector of the first conductivity is substantially the same as the width of the current collector of the second conductivity.

* * * * *